US008775152B2

(12) United States Patent
Carroll et al.

(10) Patent No.: US 8,775,152 B2
(45) Date of Patent: Jul. 8, 2014

(54) MULTI-CORE, MULTI-BLADE, AND MULTI-NODE NETWORK ENVIRONMENT SIMULATION

(75) Inventors: Jon Carroll, Milton, GA (US); Doug Dimola, Woodstock, GA (US); Andrew Frezell, Roswell, GA (US)

(73) Assignee: Ciena Corporation, Hanover, MD (US)

( * ) Notice: Subject to any disclaimer, the term of this patent is extended or adjusted under 35 U.S.C. 154(b) by 424 days.

(21) Appl. No.: 12/847,040

(22) Filed: Jul. 30, 2010

(65) Prior Publication Data

US 2012/0029898 A1     Feb. 2, 2012

(51) Int. Cl.
*G06F 9/44*      (2006.01)
*G06F 13/10*    (2006.01)
*G06F 13/12*    (2006.01)
*G06F 9/455*    (2006.01)
*G06F 9/48*      (2006.01)
*G06F 9/50*      (2006.01)
*G06F 11/30*    (2006.01)
*G06F 21/53*    (2013.01)

(52) U.S. Cl.
CPC ........ *G06F 9/45504* (2013.01); *G06F 9/45533* (2013.01); *G06F 9/4856* (2013.01); *G06F 9/5077* (2013.01); *G06F 11/301* (2013.01); *G06F 21/53* (2013.01); *G06F 2009/4557* (2013.01); *G06F 2009/45595* (2013.01); *G06F 2212/151* (2013.01)
USPC .................................. 703/20; 703/23; 703/24

(58) Field of Classification Search
USPC ..................................................... 703/23, 24
See application file for complete search history.

(56) References Cited

U.S. PATENT DOCUMENTS

| 6,108,309 A | 8/2000 | Cohoe et al. |
| 6,366,875 B1 | 4/2002 | Colizzi et al. |
| 2005/0256694 A1 | 11/2005 | Taylor |

OTHER PUBLICATIONS

Sami Vaarala "Security Considerations of Commodity x86 Virtualization Licentiate Thesis" May 22, 2006.*
Dynamic Virtualization and Service Provision in Multi-Provider GMPLS Networks. Prof. Dipl. Ing. Dr.techn Admela Jukan. Aug. 2007.*

* cited by examiner

*Primary Examiner* — Saif Alhija
(74) *Attorney, Agent, or Firm* — Clements Bernard PLLC; Christopher L. Bernard; Lawrence A. Baratta, Jr.

(57) ABSTRACT

The present disclosure provides systems and methods for a simulation environment that simulates hardware at a fiber level, a data plane level, a card level, and a chassis level. The simulation environment may be utilized in development and testing of complex, real time, embedded software systems, such as, for example, routers, switches, access devices, base stations, optical switches, optical add/drop multiplexers, Ethernet switches, and the like. In an exemplary embodiment, the simulation environment operates on one or more workstations utilizing a virtual machine to operate a virtualized module, line card, line blade, etc. Further, a plurality of virtual machines may operate together to operate a virtualized chassis forming a network element and with a plurality of virtualized chassis forming a network. Advantageously, the present invention provides state of the art data plane traffic and control plane simulation that reduces development time and cost while increasing design flexibility.

20 Claims, 9 Drawing Sheets

MULTI-CORE, MULTI-BLADE, AND MULTI-NODE NETWORK ENVIRONMENT SIMULATION

FIELD OF THE INVENTION

The present invention relates generally to networking. More particularly, the present invention relates to a network simulation system and method providing a simulation environment for the development and testing of complex, real time, embedded software systems.

BACKGROUND OF THE INVENTION

Conventional networks typically include interconnected network elements or nodes in various configurations. Example network elements may include routers, switches, access devices, base stations, optical switches, optical add/drop multiplexers, dense wave division multiplexers (DWDM), and the like. Each network element includes a combination of hardware, software, and firmware and typically a physical implementation includes a plurality of modules, cards, blades, etc. interconnected via an interface such as a backplane, mid-plane, etc. Effectively, each network element is a complex, real time, embedded software system. With respect to development and testing of software related to a particular network element, hardware that the software is supposed to run on is usually not available due to expense, limited availability of the hardware, or simply that the hardware has not been designed and prototyped yet. Concurrent software development with hardware development may provide reduced development time and effort. Conventionally, there does not exist a fully encompassing simulation of a fiber network that allows the developers to fully test a complex, real time, embedded software system down to the driver level. Further, a "simulated" traffic generating test set to test the simulated data plane is a key missing component preventing conventional simulators from testing the full system. Thus there is a need for systems and methods providing a simulation environment for the development and testing of complex, real time, embedded software systems such as network elements in a communication network.

BRIEF SUMMARY OF THE INVENTION

In an exemplary embodiment, a network simulation system includes one or more interconnected workstations; software executed on the one or more workstations, wherein the software is configured to: operate a plurality of virtual machines with each virtual machine executing a hardware simulation application configured to operate in a same manner as a corresponding actual hardware device; and interface to a software load via a driver within each of the plurality of virtual machines, wherein the software load is associated with a network element. The software may be configured to operate a virtual switch interconnecting two or more of the virtual machines thereby forming a chassis. Also, the software may be configured to operate a fiber simulation in two or more of the plurality of virtual machines, wherein the fiber simulation is configured to simulate fiber connectivity between the two or more of the plurality of virtual machines. The software load may include a software load configured to operate on future developed hardware, and wherein the network simulation system is utilized to test the software load via the hardware simulation application. The software load operates on the plurality of virtual machines and on actual hardware. The plurality of virtual machines simulates a plurality of nodes with fiber connections simulated therebetween. The software may be configured to operate a virtual test set configured to inject simulated traffic through the plurality of nodes, and the virtual test set may include any of SONET, SDH, Optical Transport Network, and Ethernet. The software may be configured to simulate a data plane including time division multiplexed traffic through the plurality of nodes or simulate Ethernet packets through the plurality of nodes.

In another exemplary embodiment, a network simulation method includes operating a plurality of virtual machines one or more interconnected workstations with each virtual machine executing a hardware simulation application configured to operate in a same manner as a corresponding actual hardware device; operating a software load corresponding to a network element, wherein the software load is configured to execute on the actual hardware device; and simulating the actual hardware device via the plurality of virtual machines to operate the software load without the actual hardware device. The network simulation method may further include forming a chassis through one or more of the plurality of virtual machines; and operating a fiber simulation in two or more of the plurality of virtual machines, wherein the fiber simulation is configured to simulate fiber connectivity between the two or more of the plurality of virtual machines. The network simulation method may further include utilizing the plurality of virtual machines to simulate the actual hardware device for testing and development. The network simulation method may further include operating the plurality of virtual machines to simulate a plurality of nodes with fiber connections simulated therebetween. The network simulation method may further include operating a virtual test set configured to inject simulated traffic through the plurality of nodes, wherein the virtual test set includes any of SONET, SDH, Optical Transport Network, and Ethernet. The network simulation method may further include simulating a data plane including time division multiplexed traffic through the plurality of nodes or simulating Ethernet packets through the plurality of nodes.

In yet another exemplary embodiment, an optical network simulation environment system includes a plurality of nodes simulated via a plurality of virtual machines executed on one or more interconnected workstations; fiber interconnections between the plurality of nodes via a fiber simulation executed on the one or more interconnected workstations; a test set simulation executed on the one or more interconnected workstations, wherein the test set simulation is configured to inject data traffic through the plurality of nodes; and a software load for actual hardware, wherein the software load is configured to execute on the plurality of nodes via simulation drivers and hardware simulation software. The plurality of nodes may include optical switches configured to switch SONET, SDH, Optical Transport Network, and Ethernet traffic between a plurality of modules on each of the plurality of nodes, and wherein the plurality of virtual machines simulate the plurality of modules. The simulation drivers interface with a hardware abstraction layer associated with the software load and the hardware simulation software simulates actual hardware functionality.

BRIEF DESCRIPTION OF THE DRAWINGS

The present invention is illustrated and described herein with reference to the various drawings of exemplary embodiments, in which like reference numbers denote like method steps and/or system components, respectively, and in which.

DETAILED DESCRIPTION OF THE INVENTION

In various exemplary embodiments, the present invention provides systems and methods for a simulation environment that simulates hardware at a fiber level, a data plane level, a card level, and a chassis level. The simulation environment may be utilized in development and testing of complex, real time, embedded software systems, such as, for example, routers, switches, access devices, base stations, optical switches, optical add/drop multiplexers, DWDM devices, Ethernet switches, Optical Transport Network (OTN) switches, and the like. In an exemplary embodiment, the simulation environment operates on one or more workstations utilizing a virtual machine to operate a virtualized module, line card, line blade, etc. Further, a plurality of virtual machines may operate together to operate a virtualized chassis forming a network element. Advantageously, the present invention provides state of the art data plane traffic and control plane simulation that reduces development time and cost while increasing design flexibility.

Figure 1:
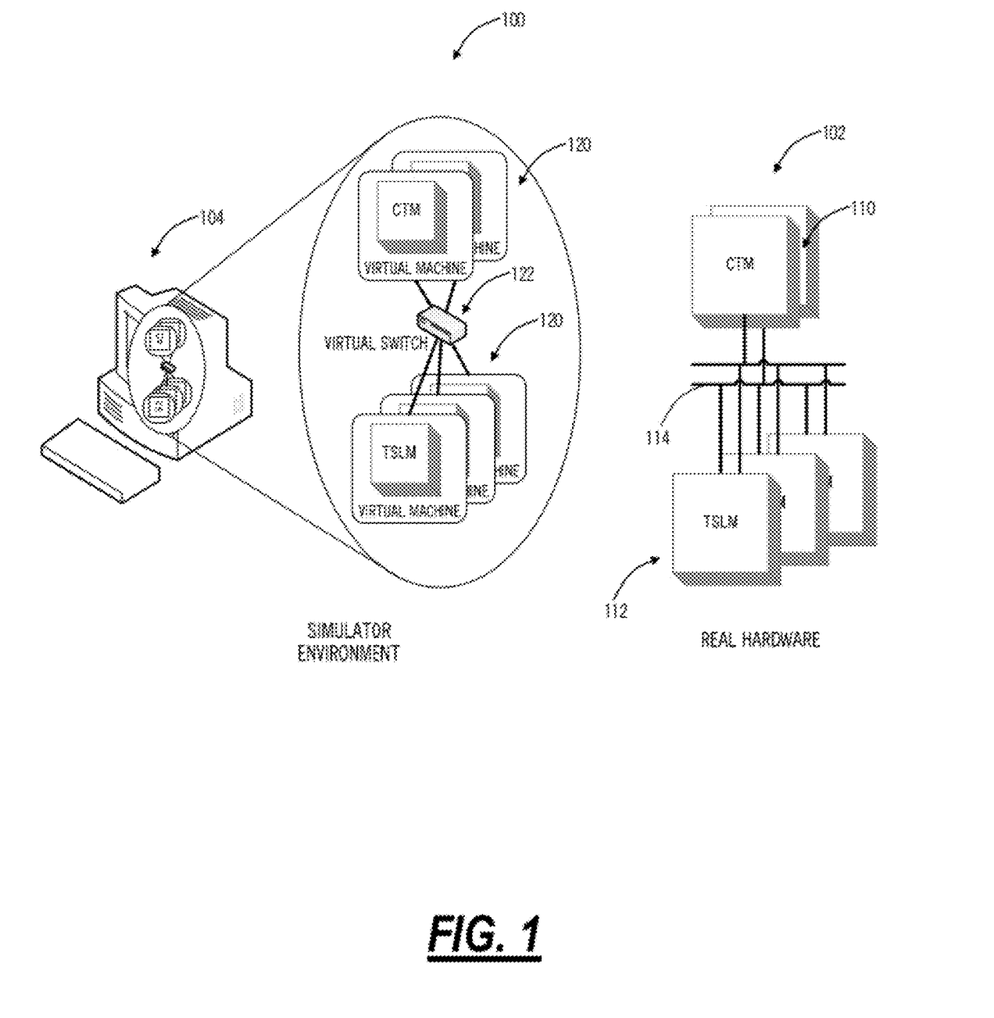
FIG. 1 is a diagram comparing a simulator environment with an actual hardware deployment.

Referring to FIG. 1, in an exemplary embodiment, a diagram compares a simulator environment 100 with an actual hardware deployment 102. As described herein, the simulator environment 100 of the present invention includes machine-executable software operating on a workstation 104 or the like and configured to simulate hardware execution of the same software that operates on the actual hardware deployment 102. The actual hardware deployment 102 may include cards such as a control modules 110 and services line modules 112 that are interconnected via an interface 114 (i.e., a bus, backplane, etc.). For example, the control modules 110 may each provide operations, administration, maintenance, and provisioning (OAM&P) functionality associated with a chassis, network element, node, etc. The services line modules 112 may provide ingress and egress of various services such as, for example, OC-192/STM-64, OC-48/STM-16, OC-12/STM-4, OTUk (k=1, 2, 3, . . . ), Gigabit Ethernet (GbE), 10 GbE, 40 GbE, 100 GbE, Fibre Channel, and the like. Further, the actual hardware deployment 102 may include other modules not shown such as different services line modules for a plurality of existing and emerging services, switching modules, and the like. Those of ordinary skill in the art will recognize the modules 110, 112 are shown herein for illustration purposes only. In the actual hardware deployment 102, each of the modules 110, 112 runs its own operating system, firmware, and software independently of the other modules 110, 112. For example, the modules 110, 112 may be viewed of as a black box with various inputs and outputs via the interface 114 and optical interfaces on the modules 112.

The simulator environment 100 is configured to operate on one or more workstations 104 to provide a simulation of the actual hardware deployment 102 that can be utilized to test, run, model, etc. software for the actual hardware deployment 102. Specifically, the simulator environment 100 includes a plurality of virtual machines (VMs) 120 that are interconnected via a virtual switch 122. The virtual machines 120 are a software implementation of a machine (i.e. a module 110, 112) that executes programs like a physical machine. The simulator environment 100 utilizes each virtual machine 120 to represent a corresponding module 110, 112. Each module 110, 112 is simulated in the virtual machine 120 like QEMU in LINUX (QEMU is a generic and open source machine emulator and virtualizer). The modules 110, 112 are linked together via a virtual LAN bridge. The "node" is linked to the host machine's LAN via another virtual bridge (management bridge). A simulation application (simApp) runs on each virtual machine 120. This maintains the simulated hardware components for the card type being simulated. The simApp is configured handle user requests as well as system requests. User requests may come in from a command line interface (CLI) via an IPC (inter-process communication) application like LINX in LINUX. System requests simulate interactions between the simulated drivers and simApp. This is done via input/output control (ioctl) calls or IPC calls. Backplane traffic between cards is sent via an IPC application. Thus each of the virtual machines 120 runs its own LINUX operating system and software independently just like the real card would. The virtual machines 120 are linked via the virtual bridge or switch 120 to connect the virtual machines 120 together like the backplane or interface 114 on the actual hardware deployment 102.

Figure 2:
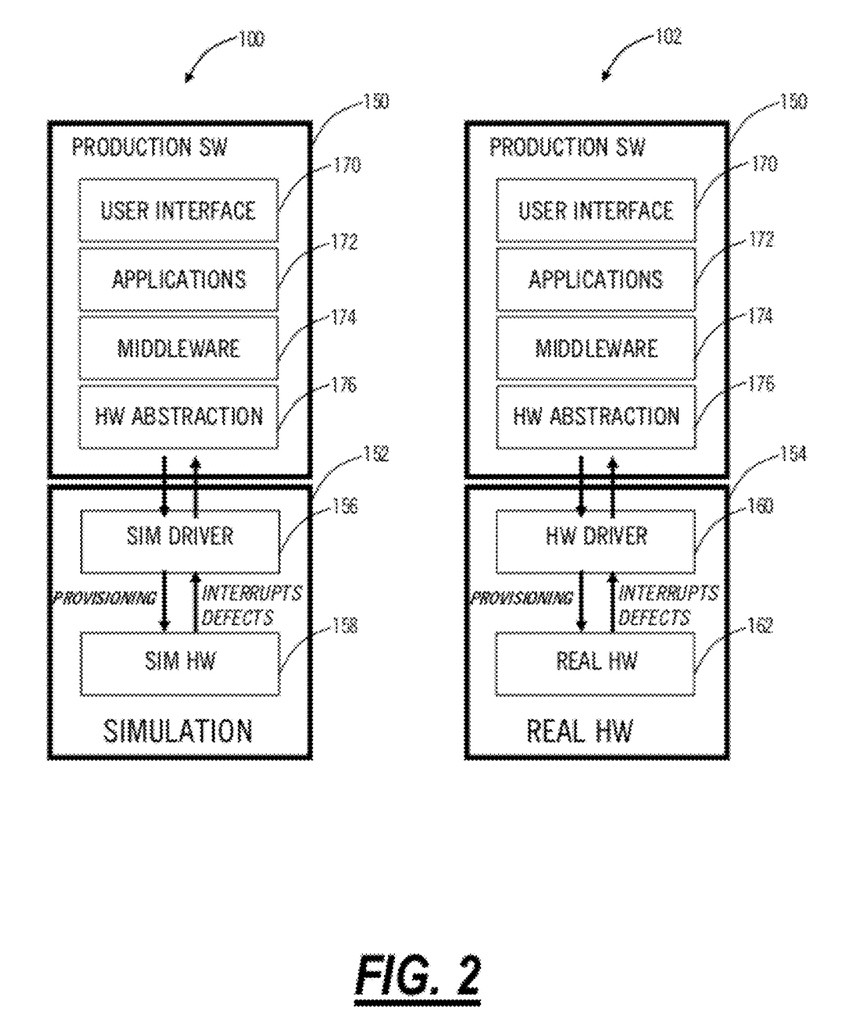
FIG. 2 is a diagram of software stacks diagrams comparing the simulator environment with the actual hardware deployment.

Referring to FIG. 2, in an exemplary embodiment, software stack diagrams compares the simulator environment 100 with the actual hardware deployment 102. In both the simulator environment 100 and the actual hardware deployment 102, the present invention utilizes production software 150 associated with the module 110, 112, the network element, a particular software release, etc. As noted herein, the production software 150 may be the same for the simulator environment 100 and the actual hardware deployment 102. The simulator environment 100 includes simulation software 152 instead of real hardware 154 with the actual hardware deployment 102. Specifically, the virtual machine simulator environment 100 is virtually identical to the real production load except for the drivers and the addition of the simulated hardware code, referred to collectively as the simulation software 152. Advantageously, the present invention provides complete testing of the production software 150 with the he only change to the software is at the very bottom layers that communicate to the real hardware. So the drivers are the only code that cannot be tested with simulation.

The simulation software 152 includes a simulation driver 156 and simulation hardware 158. The simulation driver 156 includes code that allow the software to control (or "drive") underlying hardware. In the simulator environment 100, the simulation driver 156 drives the simulated hardware 158. Conversely, the real hardware 154 includes a hardware driver 160 and real, physical hardware 162. The hardware driver 160 provides similar functionality as the simulation driver 156 to drive the physical hardware 162. In an exemplary embodiment, the hardware 154 includes a single module, card, blade, etc. The hardware 154 runs its own real-time operating system (OS) such as LINUX. The hardware driver 160 "drives" the physical pieces of hardware (such as a hard disk, application specific integrated circuits, field programmable gate arrays, network processors, and the like).

The production software 150 includes a user interface 170, applications 172, middleware 174, and hardware abstraction 176. The hardware abstraction 176 provides hardware abstraction layer (HAL) that is on top of the drivers 156, 160 that the rest of the software 150 uses to communicate to the driver layer. This allows the software 150 to make basic calls like "write to hard disk" without having to know the specifics of the particular type of hard drive present, for example. So if you replace the hard drive, you write a new driver and the rest of the software remains the same. So the HAL encapsulates the real hardware and drivers from the rest of the software 150. On top of the HAL are one or more middleware 174 layers. As the name implies, these layers sit in between (in the middle of) the HAL and the applications 172. The middleware 174 is used to standardize tasks that multiple applications need done. For instance, defect handling is required for many applications; when a port no longer is receiving light, the hardware may trigger an interrupt to software to indicate that a loss of signal event has occurred, for example. The middleware 174 will receive this event and notify all the applications 172 that are interested in that event instead of having all the applications 172 duplicate that effort. The middleware 174 may also manage critical resources (like a hardware timer) to reduce contention and a possible deadlock for that resource. On top of the middleware layer are the various applications 172, some of which also use each other. These usually implement user recognized activities involving OAM&P like Automatic Protection Switch (APS) and may span multiple cards and carry on network level communications with other nodes. The user interface 174 interfaces to the applications 172 providing an end user or network operator a mechanism to interact with the applications 172. For example, the user interface 174 may include a graphical user interface accessed via a web site or a command line interface.

The actual hardware deployment 102 may include a chassis, frame, shelf, etc. that physically holds all the modules 110, 112, cards, blades, etc. It contains other things like power distribution units (PDU), alarm lights, input/output modules for various external interfaces such as Ethernet, timing, serial ports, etc. There may be various hardware devices like boot control that hold chassis specific provisioning data that is available to new cards when they are inserted. There is also backplane connectivity in the chassis to allow the cards and all these devices to communicate with each other. In addition, there may be a backplane switch fabric to allow data traffic to be switched from card to card which is the primary function of the hardware. All of these units need to be simulated since the software interacts with all of them. Thus, there may be a simulator environment 100 representing the chassis, frame, shelf, etc. The modules 110, 112 and potentially other types of modules, blades, cards, etc. are configured to interface with the chassis, frame, shelf, etc. Accordingly, there is a simulator environment 100 for each particular module 110, 112, blade, card, etc. For example, there may be two, redundant, central processor cards (CTX). These have two multi-core processors that each need to be simulated with their own LINUX environments. The simulator environments 100 for the CTX cards provide a capability to have only one CTX primary (the main controller) at a time and allow for switching primary status between them. In a typical network element, node, etc., each element includes the CTXs or equivalent providing a centralized OAM&P control function and data repository.

In an exemplary embodiment, the present invention may provide a simulator environment for an optical switch. Note, the present invention contemplates other types of networks and network elements with the optical switch described herein for illustration purposes. An optical switch is generally configured to interface to a plurality of optical ports and to provide switching therebetween. Switching may be at a wavelength level, SONET/SDH granularity, OTN granularity, Ethernet packets, and the like. In one exemplary embodiment, the optical switch may include a three stage Clos switching fabric. Here, there may be modules for the switch modules (SM) that constitute the "center stage" of a three stage, Clos data switch fabric. The three stages are in (ingress), connection (center), and out (egress). The center simply connects an input port with an output port. The ingress and egress parts of the Clos switch fabric reside on the line modules (LM). LMs have optical ports on them that receive data traffic which they connect to the switch as well as manage the incoming and outgoing signals. Each port may receive OTU, SONET/SDH, or Ethernet signals. Like the CTX cards, each LM and SM has its own processor, operating system, and hardware components that require simulating. Thus, the present invention contemplates a simulation environment 100 for each SM and LM module.

The present invention may further include a simulated test set. This allows the user to inject "traffic" into the network and verify that the traffic travels through the simulated hardware and arrives at the desired location. The simulated test set requires the capability of injecting defects like a real test set and having various line rates like SONET/SDH, OTU, and Ethernet. Further, there is timing support. Timing refers to how traffic is kept in sync between nodes. Timing can be derived from a building integrated timing supply (BITS) clock via an I/O panel, it can be recovered from one of the incoming LM fibers connected to another chassis, or it can come from a clock residing on the primary CTX card. Whatever the source of the timing, it is also gets distributed to other chassis via outgoing LM fibers. Generally, each chassis, shelf, frame, etc. constitutes a node on a fiber optic network. These nodes are interconnected via fiber optic cables as well as having Ethernet connectivity for management traffic. The optical signals are sent via various protocols such as SONET, SDH, OTN, and Ethernet. There can also be sub-protocols running within the main protocols like Internet Protocol (IP) over data communication channels (DCC) within the SONET DCC overhead or Ethernet within SONET Generic Framing Protocol (GFP), then wrapped in OTN. The present invention simulates fiber connectivity as well as all of these protocols to allow network testing of the applications.

Figure 3:
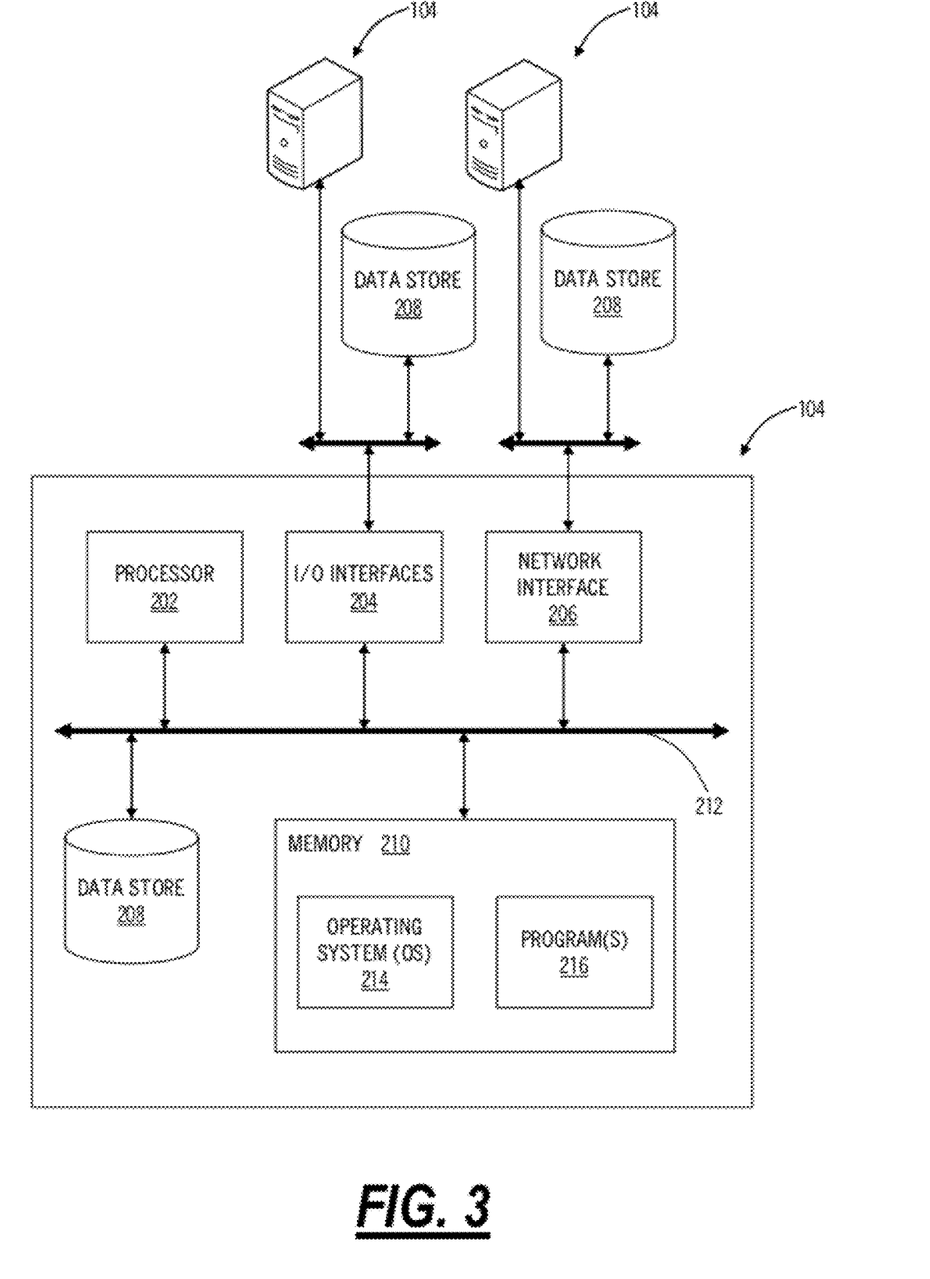
FIG. 3 is a block diagram of a system which may be utilized to operate the simulator environment, various virtual machines, and a virtual switch.

Referring to FIG. 3, in an exemplary embodiment, a block diagram illustrates a system 200 which may be utilized to operate the simulator environment 100, the various virtual machines 120, and the virtual switch 122. In general, the system 200 includes one or more interconnected workstations 104. Since one workstation 104 may not be able to handle too many simulated chassis, the system 200 supports the network being on one workstation 104 or spread out on multiple workstations 104. The system 200 may also support a simulated test set as well as being configurable to allow the user to easily change how each node and network is laid out. This configurability allows individual cards, modules, blades, etc. to be collectively and individually added, deleted, stopped, and restarted. The workstation 104 may be a digital computer that, in terms of hardware architecture, generally includes a processor 202, input/output (I/O) interfaces 204, a network interface 206, a data store 208, and a memory 210. The components (202, 204, 206, 208, and 210) are communicatively coupled via a local interface 212. The local interface 212 may be, for example but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the workstation 104, a semiconductor-based microprocessor (in the form of a microchip or chip set), or generally any device for executing software instructions. When the workstation 104 is in operation, the processor 202 is configured to execute software stored within the memory 210, to communicate data to and from the memory 210, and to generally control operations of the workstation 104 pursuant to the software instructions. The I/O interfaces 204 may be used to receive user input from and/or for providing system output to one or more devices or components. User input may be provided via, for example, a keyboard, touch pad, and/or a mouse. System output may be provided via a display device and a printer (not shown). I/O interfaces 204 can include, for example, a serial port, a parallel port, a small computer system interface (SCSI), an infrared (IR) interface, a radio frequency (RF) interface, and/or a universal serial bus (USB) interface.

The network interface 206 may be used to enable the workstation 104 to communicate on a network, such as the Internet, a local area network, etc. For example, the workstation 104 can utilize the network interface 206 to communicate to/from other workstations 104. The network interface 206 may include, for example, an Ethernet card or adapter (e.g., 10BaseT, Fast Ethernet, Gigabit Ethernet) or a wireless local area network (WLAN) card or adapter (e.g., 802.11a/b/g/n). The network interface 206 may include address, control, and/or data connections to enable appropriate communications on the network. A data store 208 may be used to store data such as data related to the simulator environment 100. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the workstation 104 such as, for example, an internal hard drive connected to the local interface 212 in the workstation 104. Additionally in another embodiment, the data store 208 may be located external to the workstation 104 such as, for example, an external hard drive connected to the I/O interfaces 204 (e.g., SCSI or USB connection). In a further embodiment, the data store 208 may be connected to the workstation 104 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another, but can be accessed by the processor 202. The software in memory 210 may include one or more software programs, each of which includes an ordered listing of executable instructions for implementing logical functions. The software in the memory 210 includes a suitable operating system (o/S) 214 and one or more programs 206. The operating system 214 essentially controls the execution of other computer programs, such as the one or more programs 206, and provides scheduling, input-output control, file and data management, memory management, and communication control and related services. The operating system 214 may be any of Windows NT, Windows 2000, Windows XP, Windows Vista, Windows 7, Windows Server 2003/2008 (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C.), or the like. The one or more programs 216 may be configured to implement the various processes, algorithms, methods, techniques, etc. described herein with respect to the simulator environment 100.

Figure 4:
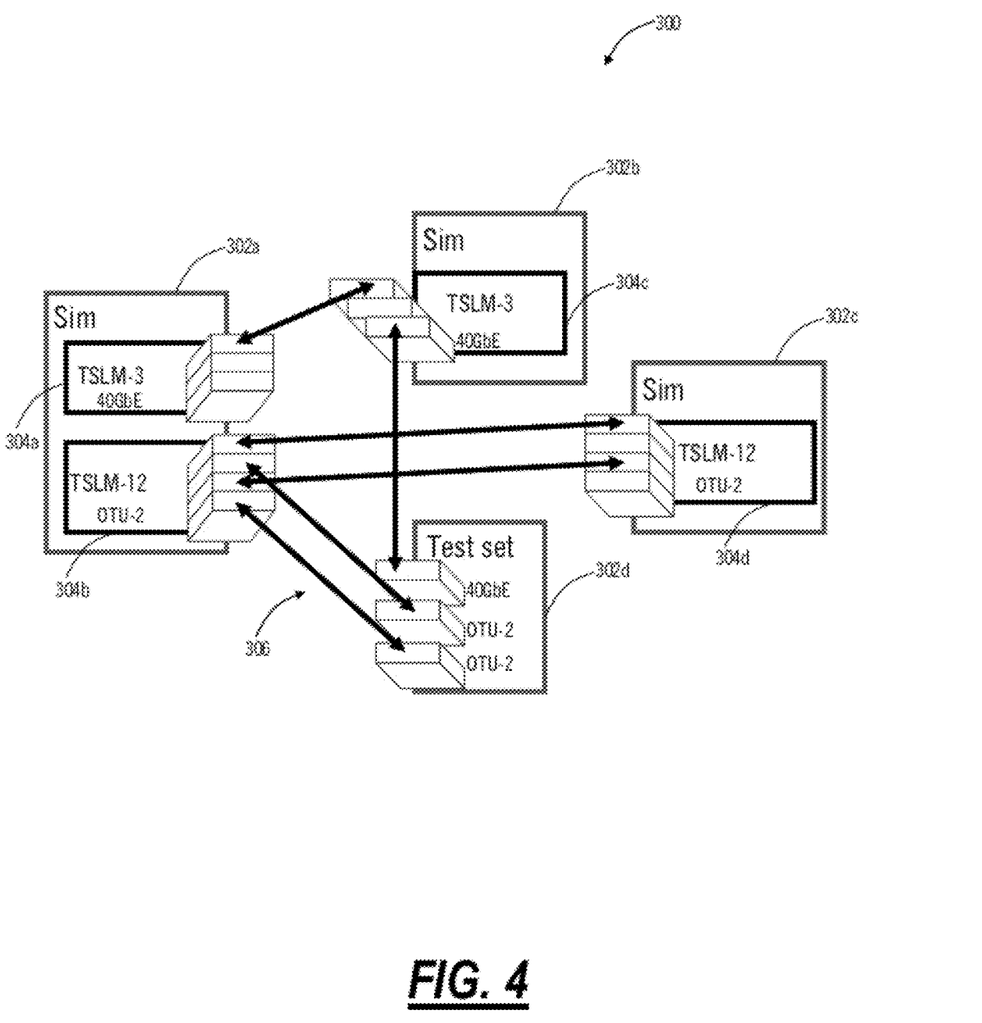
FIG. 4 is a diagram of a simulation with a plurality of virtual machines interconnected by simulated fiber link.

Referring to FIG. 4, in an exemplary embodiment, a simulation 300 is illustrated with a plurality of virtual machines 302, 304 interconnected by simulated fiber links 306. The virtual machines 302 include four distinct network elements 302a, 302b, 302c, 302b variously interconnected by the fiber links 306. The network elements 302a, 302b, 302c represent optical network elements provide Ethernet and OTN connectivity and switching and the network element 302d represents a simulated test set providing 40 GbE and OTU-2 simulation. The virtual machines 304 include modules on the network elements 302a, 302b, 302c including virtual machines 304a, 304b, 304c, 304d. Each of the 304a, 304b, 304c, 304d have simulated connections to the network elements 302a, 302b, 302c and amongst one another through the fiber links 306. A major difference between the present invention and other, conventional simulators is fiber connectivity. Specifically, each of the virtual machines 302d, 304a, 304b, 304c has corresponding fiber ports that are simulated and allowed to connect therebetween via the fiber links 306. In an exemplary embodiment, the fiber links 306 are simulated in the virtual switch 122 application. A fiber simulation in one of the virtual machines 302d, 304a, 304b, 304c can be connected to any other fiber simulation. For example, this may be on a particular workstation 104 or over a connection between workstations 104. A user may instruct the simulator environment to connect Node A, LM A-1, port 1 to Node B, LM C-15, port 8, and this may be via a graphic user interface "point and click" or through a CLI. This allows a user to "fiber up" their simulated nodes to each other and to traffic simulation test sets via the virtual machine 302d (which use the same fiber simulations for each test set port). Once connected and the lasers are turned on (port unlocked), traffic may flow through the data plane components of each module to initiate traffic testing.

In an exemplary embodiment, the configuration of the various virtual machines 302, 304 may be a user created text file or the like. It may allow the user to specify the type and number of cards in the system. It may also allow some configuration settings like how much memory to dedicate to each card and the management IP addresses and node name for each chassis. The simulator environment 100 may include a simulation control application created to run on the workstation 104 to read the configuration file and to create and destroy the simulations via creating a plurality of virtual machines on the system 200. In the real hardware, fiber optic cables interconnect two optical ports together. Each port has a transmit fiber and a receive fiber for bidirectional connectivity. So a fiber object in the simulator environment 100 needs to interconnect two simulation ports together. This is done via an inter process communication (IPC) application. Messages can be passed between two ports. These messages have a predefined overhead and data to allow for communications between simulated ports on cards and test set ports. The fiber can also be "degraded" or "cut" by the user to simulate traffic loss to the system.

The virtual machines 302, 304 enable each simulated card to execute as if it was the only thing running in the system 200. Thus, the simulator environment 100 may support multiple chassis, test sets, etc. on a single workstation 104. A virtual environment runs its own operating system and applications making it appear to them that they are the only thing running on the box. It encapsulates the real hardware from the operating system (like a HAL layer). Virtual machines 302, 304 have the extra ability to be set to simulate multi-core as well. The user is given the ability to specify a text file that describes each chassis that the user wishes to simulate. They may pick one or two CTX cards and one or more LM cards. They can also specify how much memory to dedicate to each card and what type of LM is required. The cards may communicate via an IPC to simulate backplane communication. There is a "node" or "chassis" concept where a group of simulated cards are "plugged into" a chassis. These cards are interconnected by a backplane that is within the simulation environment 100. Also any chassis specific components like fan trays, power distribution modules, etc. are maintained here. The virtual machine 302d provides a simulated test set that allows for traffic testing that completes the testing capabilities. This allows the user to inject SONET/SDH, OTN, and GbE traffic via data packets. The user may also inject defects into the overhead and data to allow for complete testing.

Figure 5:
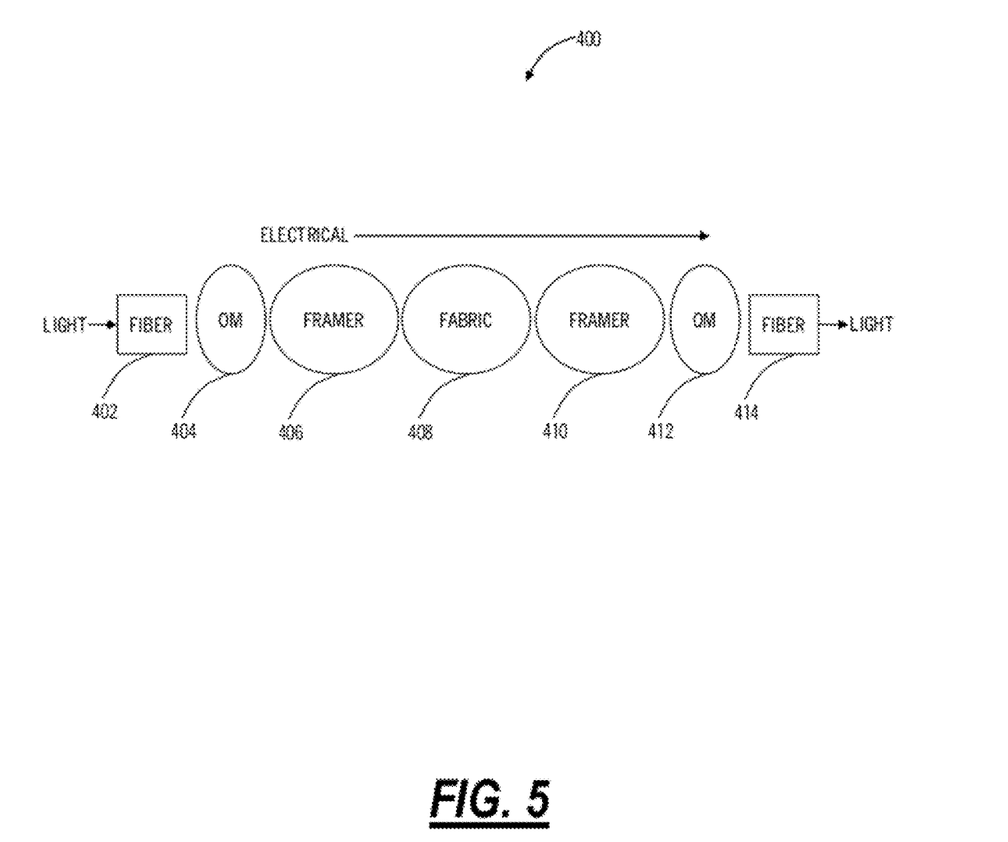
FIG. 5 is a data plane simulation diagram showing various associated components.

Referring to FIG. 5, in an exemplary embodiment, a data plane 400 simulation is illustrated showing various associated components. The fiber object is an end point for the data plane 400. The data plane 400 includes all of the simulated hardware components that handle traffic. The data plane 400 simulation illustrates an exemplary embodiment of a particular data plane. Specifically, a fiber object 402 connects to an optical module (OM) 404 to a framer 406 to a switch fabric 408 to another framer 410 to another OM 412 and out another fiber object 414. Each of these respective components 402-411 are modeled and simulated in the simulator environment 100. Simulated traffic comes via the fiber object 402 and goes to the OM 404. If the OM 404 is "unlocked" (passing light) then the data moves into the framer 406 and other components. These components look at the incoming data header and determine if they are interested in the packet. They can terminate, modify, or allow the packet to pass untouched. All consequent actions that the actual hardware components perform on the traffic are performed by the simulator environment 100.

The data plane 400 is used to manage and switch traffic such as time division multiplexed (TDM) traffic (e.g., SONET/SDH, OTN, etc.), packet traffic (e.g., Ethernet), etc. For TDM traffic, for example, there are three main components as discussed herein, the OM 404, 412, the framer 406, 410, and the switch fabric 408. The OM 404, 412 is an interface to transmit/receive incoming light signals via connected fibers and to interface the light signals to/from electrical signals. These electrical signals are interfaced with the framers 406, 410. The framer 406, 410 is configured to align the incoming data into SONET, SDH, or OTN frames. It can also be manipulated and monitored for performance monitoring, timing, interrupts, defects, etc. The framer 406, 410 passes data for any timeslots provisioned to the correct ingress timeslots in the switch fabric. The actual hardware in the framer 406, 410 may include a serializer-de-serializer (SERDES), a port field programmable gate array (FPGA) and various other components. The switch fabric 408 may be realized in a distributed manner with, for example, switching components on the LMs and the SMs, or in a centralized manner. For example, the switch fabric 410 in a three stage Clos switch includes an ingress switch to center stage switch to egress switch. All connections through the data plane 400 go through the switch fabric 410 and then onto the framer 410 and the OM 412 where the electrical signals are converted back to light and sent out a fiber. The simulator environment 100 has the same components as the hardware. For example, the simulator environment 100 may send special simulation data packets to the fiber object 402 and then routes them through the simulated components on the LMs and SMs just like real hardware. The framers 406, 410 may generate interrupts and notifications as appropriate. The simulated three-stage switch fabric is setup via the same provisioning that occurs for real hardware and routes data via their timeslots through the three stages just like the real hardware does.

Figure 6:
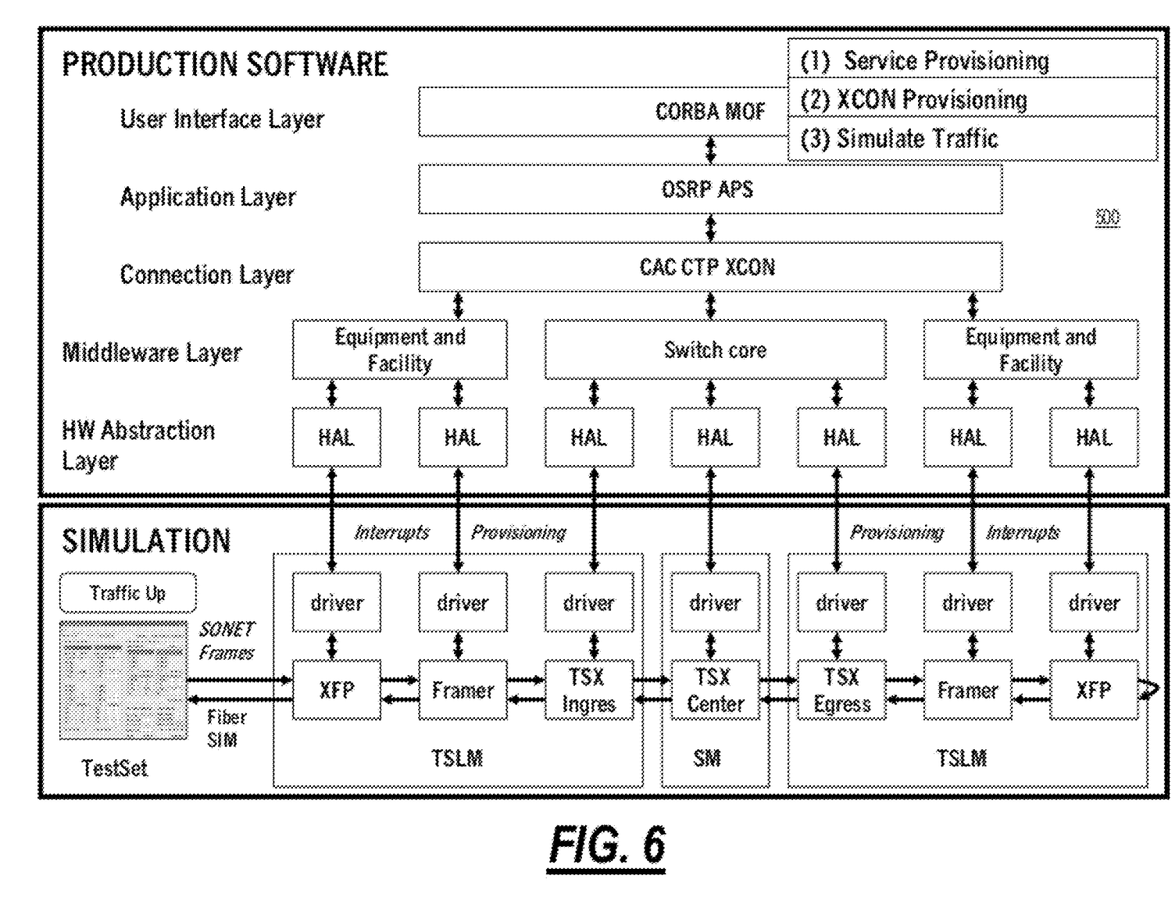
FIGS. 6 and 7 are diagrams of provisioning using production software with the simulator environment and with the actual hardware deployment.
Figure 7:
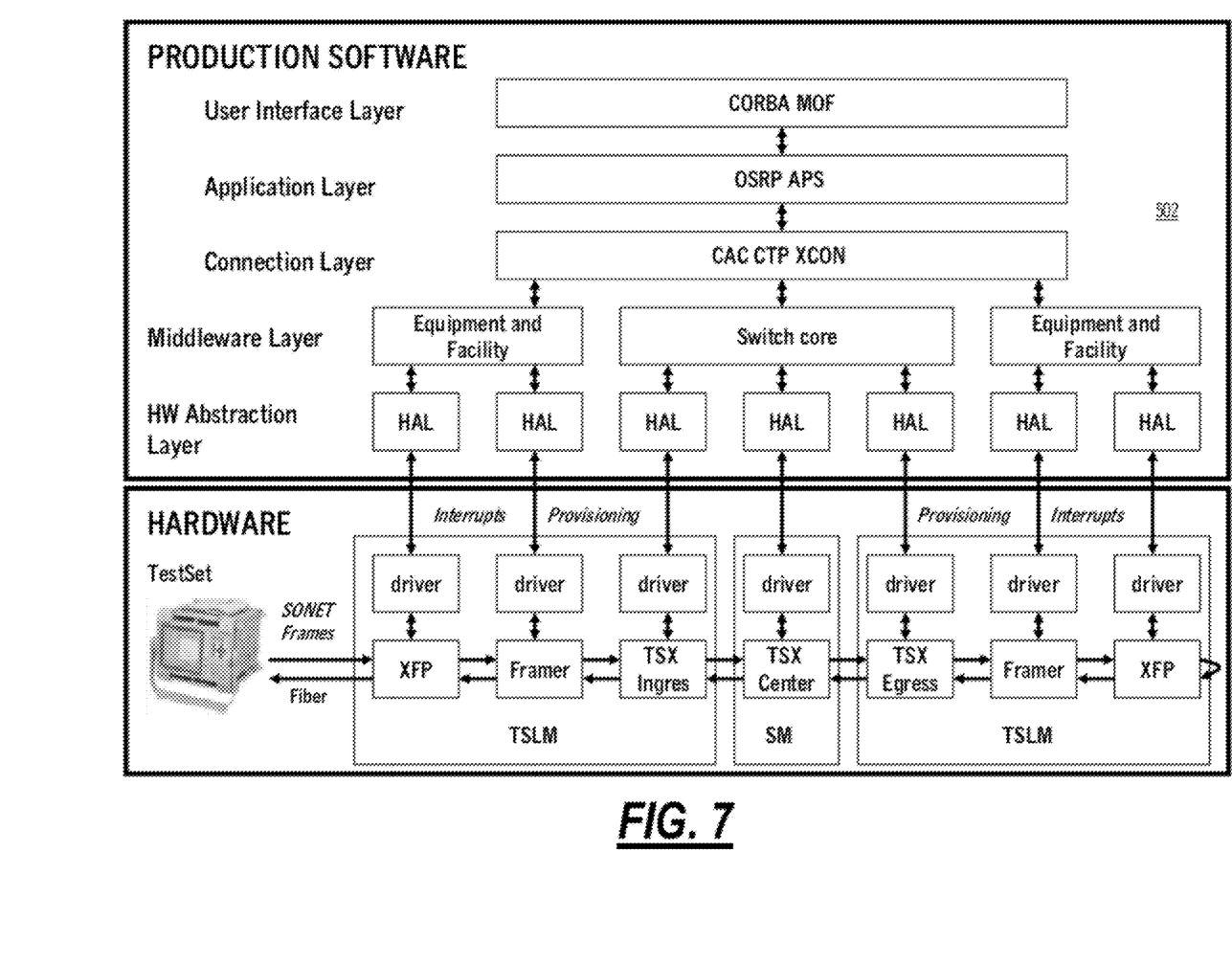

Referring to FIGS. 6 and 7, in exemplary embodiments, diagrams illustrate provisioning 500, 502 using the production software 150 with the simulator environment 100 and with the actual hardware deployment 102. Again, the provisioning 500, 502 is illustrated herein with reference to a three stage Clos switch. The provisioning 500 in FIG. 6 illustrates the production software 150 with the simulator environment 100, and the provisioning 502 in FIG. 7 illustrates the same production software 150 with the actual hardware deployment 102. In particular, the production software 150 is the same between the HAL layer and the user interface layer with the differences between the provisioning 500, 502 at the driver layer. In this exemplary embodiment, the three stage switch is formed using three modules—TSLM (TDM services line module) to switch module (SM) to TSLM. Here, the TSLMs function as the ingress and egress switches and the SM as the center stage switch. As described herein, the simulator environment 100 may provide a virtual machine for each of the modules, TSLMs, SM, etc. Alternatively, there may be a virtual machine for each of the various components within the modules (i.e., XFP optical module, framer, TSX—time-space switch, etc.).

In this exemplary embodiment, the production software 150 includes a Common Object Request Broker Architecture (CORBA) Meta Object Facility (MOF) at the user interface layer. At the application layer, the production software 150 may utilize a switching and routing protocol for networks. For example, the switching and routing protocol may include Optical Signaling and Routing Protocol (OSRP), Automatically Switched Optical Networks—ITU-T Recommendation G.8080: Architecture for the Automatically Switched Optical Network (ASON) 2001, Generalized Multi-Protocol Label Switching Architecture (G-MPLS) IETF RFC 3945, 2004, and the like. OSRP is a distributed protocol designed for controlling a network of optical switches 100 or cross-connects (OXCs). OSRP introduces intelligence in the control plane of an optical transport system. It may perform many functions such as automatic resource discovery, distributing network resource information, establishing and restoring connections dynamically across the network, and the like. However, the present invention is not limited to OSRP. Those skilled in the art will recognize that other intelligent signaling and routing protocols that can (or can be modified to) provide similar functionality as OSRP (e.g., automatically establishing and restoring connections across the network, and the like) are within the scope of embodiments of the invention.

Also, the production software 150 may include a connection layer between the application layer and the middleware layer. The connection layer provides call admission control (CAC) connection termination point (CTP) cross connects. For example, the connection layer may be utilized with the switching and routing protocol. The middleware layer interfaces between the connection layer and the HAL layer. In both the simulator environment 100 and the actual hardware 102, each component in the TSLM and SM modules may have a driver to interface to the HAL layer. Finally, each of the components, i.e. XFP, framers, TSXs, etc. are configured to exchange data traffic between one another. The provisioning 500 may include service provisioning, cross-connect provisioning, and traffic simulation. The simulator environment 100 may include a simulated test set (shown in FIG. 6) to interface simulated SONET/SDH frames, OTN frames, Ethernet packets, etc. through the simulator environment 100. By comparison, the provisioning 502 may include a physical test set external to the TSLM module (shown in FIG. 7).

As described herein, the test set may be implemented via the virtual machine 302d in the simulator environment 100. The test set is configured to simulate TDM and/or Ethernet traffic over various network elements through the simulator environment 100. In particular, the test set is configured with the same functionality and capability as a physical test set for SONET/SDH, OTN, and Ethernet. The functionality and capability may include generating and monitoring traffic on provisioned services; injecting defects and overhead data into any layer or sub-layer; supporting various rates such as OTU-3, OTU-2, OTU-1, OC768, OC192, OC48, OC12, OC3, 40 GbE, 10 GbE, GbE; supporting embedded, and transparent OTN, SONET, SDH services; reporting alarms and failure conditions; performance monitoring; the capability to inject failures to allow testing of consequent actions; monitoring and displaying path trace messages; and the like. For example, in a SONET/SDH mode, the test set may receive the status of simulated SONET/SDH traffic, history, and section, line, and path PM overhead data and the test set may transmit the injection of defects, trace, and PMs into simulated SONET/SDH traffic as well as generating section, line, and path PM overhead data.

Figure 8:
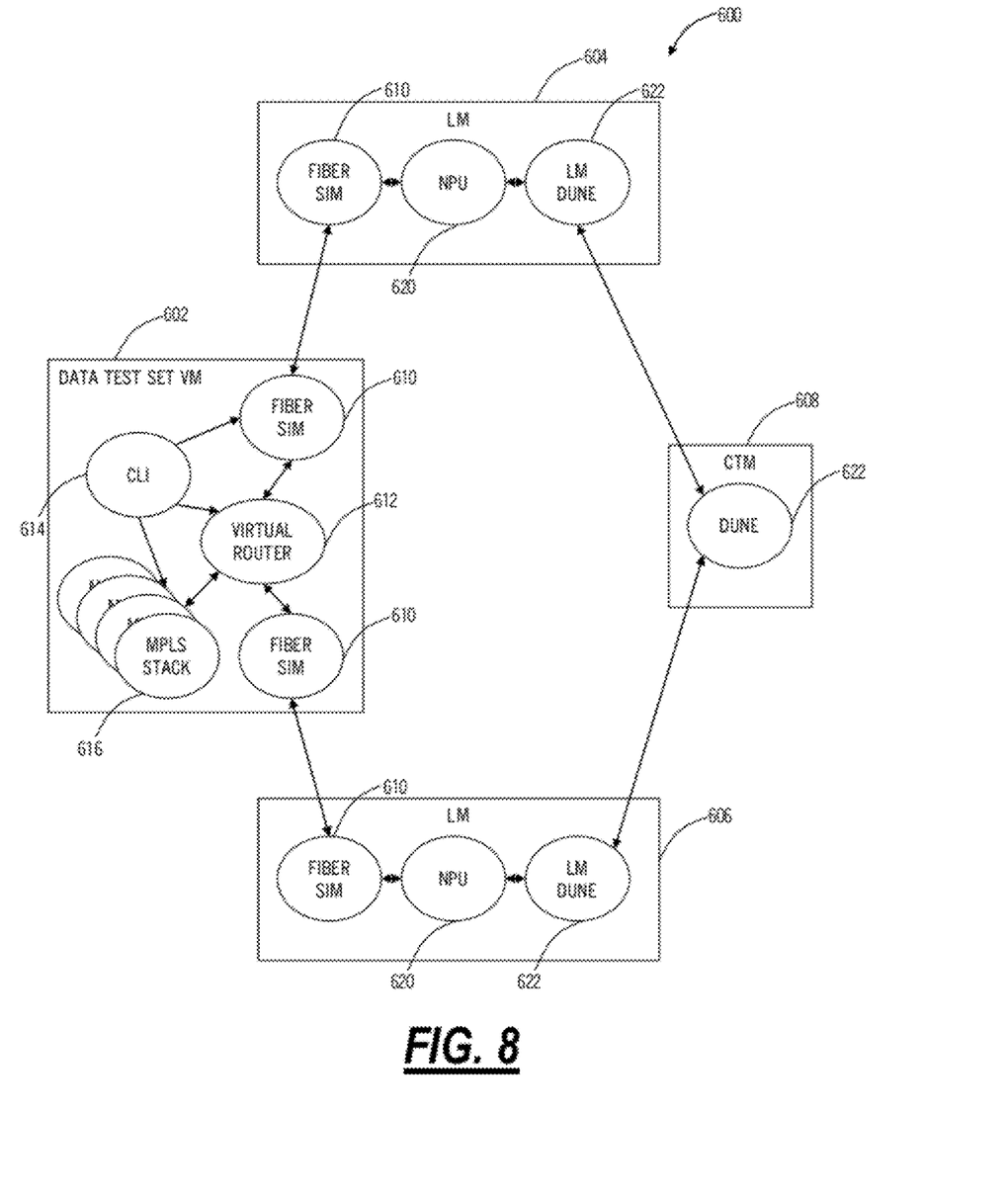
FIG. 8 is a diagram of Ethernet data simulation over the simulator environment.

Referring to FIG. 8, in an exemplary embodiment, in addition to simulating the data plane 400 in FIG. 5, the simulator environment 100 may provide Ethernet data simulation 600 over the simulator environment 100. FIG. 8 illustrates an exemplary embodiment of Ethernet data simulation 600 over the simulator environment 100. Note, the Ethernet data simulation 600 is implemented in the simulator environment 100 in a similar fashion as the data plane 400 simulation. In this exemplary embodiment, the Ethernet data simulation 600 includes a data test set virtual machine 602, two line modules 604, 606 (also as virtual machines), and a core transport manager (CTM) 608. Each of the components 602, 604, 606, 608 may be a virtual machine in the simulator environment 100. The data test set virtual machine 602 provides functionality similar to the TDM test set by injecting and monitoring Ethernet traffic through the Ethernet data simulation 600. The data test set virtual machine 602 may include objects such as fiber sims 610, a virtual router 612, a CLI 614, and a plurality of multi-protocol label switching (MPLS) stacks 616. The data test set virtual machine 602 is a "network test set" (NTS) concept instead of a SONET/OTN style port based test set. The NTS is a virtual machine that houses the multiple MPLS stacks 616 all running independently that mimic MPLS nodes on a network. They are connected to the virtual router 612 that the user configures. Some MPLS links are routed to other MPLS stacks to interlink the simulated network and some are connected to fiber simulations (same fiber sim component on the LM) that are connected to simulated boxes. Accordingly, the Ethernet data simulation 600 may provide a large MPLS network to test nodes. The user can inject packets and build and tear down links via a CLI.

The line modules 604, 606 include a fiber sim 610 connected to the fiber sims 610 in the data test set virtual machine 602, a network processor unit (NPU) 620, and a line module DUNE switch fabric 622. In the Ethernet data simulation 600 case, the framer is replaced by the NPU 620 and the TDM switch fabric is replaced by the DUNE switch fabric 622. In real hardware, the NPU is implemented via a number of "stations". At each station, a packet comes in and is inspected. A lookup table (provisioned by the software) is used to determine what happens to the packet (modified, marked yellow, dropped, which station to go to next). The simulated NPU 620 gets the same provisioning from the software and does the same decision making that the real NPU does. The last NPU 620 station wraps the packet in a DUNE header and gives the packet to the DUNE fabric 622 on the LM (the DUNE fabric in real hardware is available from Dune Networks). This forwards the packet to the DUNE "center stage" that resides on different SM cards in real hardware. In simulation's case, the center stage DUNE switch 622 resides on the current primary CTM's virtual machine 608. The DUNE has incoming and outgoing queues. These help determine where packets should go and if they are dropped. The packet then goes to an outgoing NPU and to the OM and then out the fiber.

Figure 9:
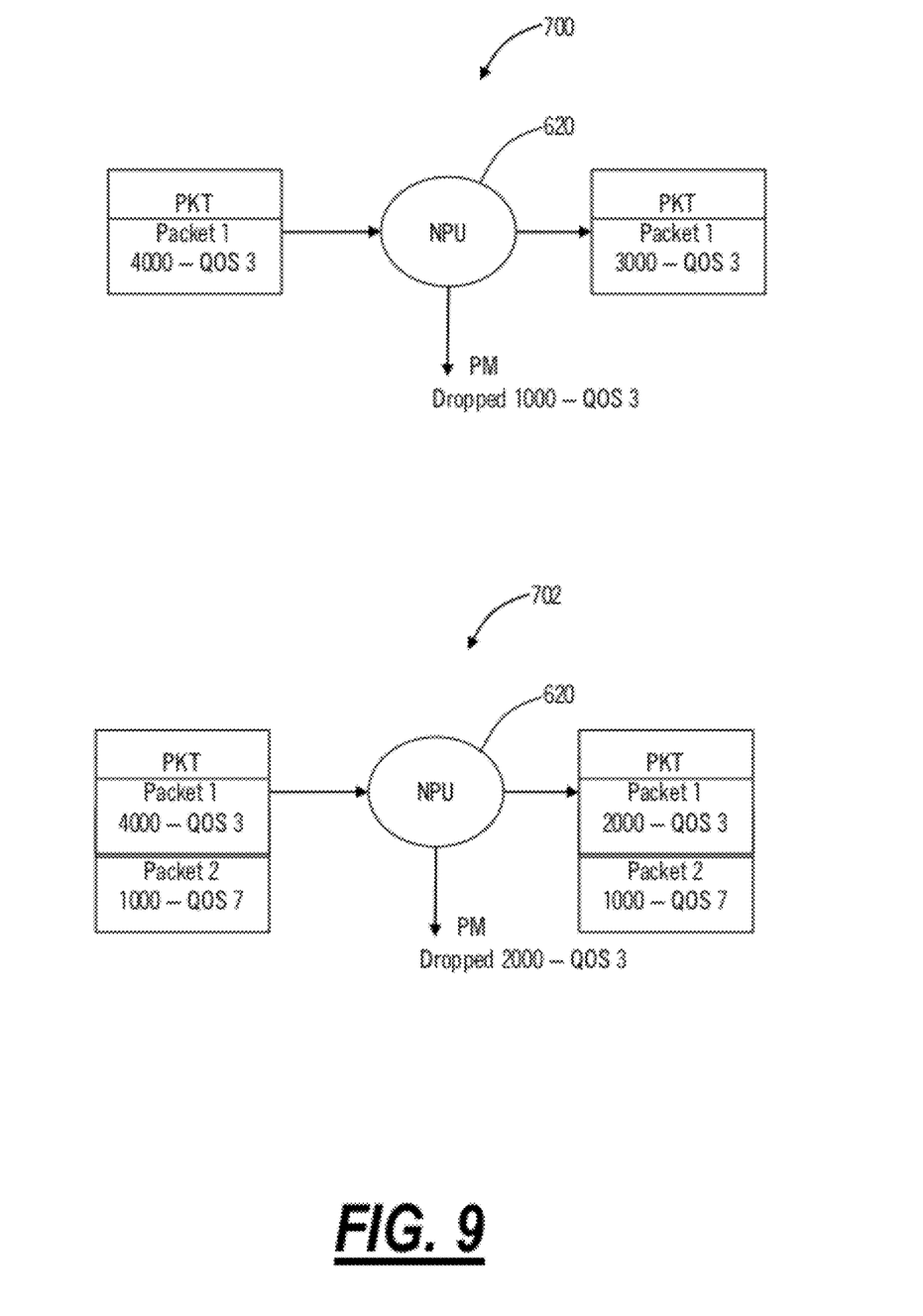
FIG. 9 is a diagram of Ethernet data simulation packets using the Ethernet data simulation.

Referring to FIG. 9, in an exemplary embodiment, Ethernet data simulation packets 700, 702 are illustrated using the Ethernet data simulation 600. The simulated Ethernet packets have all the header information that normal packets do such as virtual local area network (VLAN) IDs, quality of service (QOS), etc., with some extra simulation data. MPLS control packets look pretty much like they normally do and the stacks 616 send them out at regular intervals. The user may need to slow down the interval if he runs many stacks (configurable). The extra simulated data allows a user to set packet size, number, rate, and "trace mismatch" type data to make sure the packet sent is actually the one getting there. For example, some of the configurable parameters include size—payload size in bytes that you want to simulate; number—number of packets this packet represents; and rate which may be set to constant bit rate (CBR) or not. If not CBR, the simulation 600 sends a one-shot number of packets. If CBR, the NPU 620 acts as if it is getting a constant rate of that number of packets. In the exemplary embodiments of FIG. 9, the Ethernet data simulation packets 700, 702 include 4000 packets at 300 bytes each, in CBR mode. If sent to an actual hardware port, the NPU would process as if it was constantly getting in 4000 packets. For the Ethernet data simulation packets 700, if this triggers a packet drop at a given point in the chain (e.g., assume it is configured to only support 3000), the simulation 600 will note in its PM counters it dropped 1000 packets, change the packet to contain 3000 and forward the packet to the next station in the NPU 620. For the Ethernet data simulation packets 702, now assume the user wants to add a new flow with a higher QOS of 1000 packets. This triggers a new packet to be sent that contains the old packet of 4000 and the new one of 1000. Here, the NPU 620 is dropping 2000 packets of the first, lower QOS packet type, and allowing the new 1000 to go through. The user could also decide to inject a one time burst of 10000 packets. This would be sent as one packet with the two CBR rates, and then a new packet will be sent without the burst. The NPU 620 would decide what to do with the burst based on its provisioned criteria.

In FIGS. 5, 8, and 9, simulations were described with reference to a data plane, i.e. TDM traffic, and an Ethernet simulation. The present invention further contemplates a combination of the two. For example, the data plane simulation may include OTN coming in (e.g., OTU-4). Some sub-ODUs in the ODU4 will remain as OTN (which could be encapsulating Ethernet traffic) and be switched over the TDM fabric. The other sub-ODUs could have the OTN stripped off and the Ethernet packets within are sent to Ethernet Network Processors and then routed through a DUNE packet fabric that coexists with the switching fabric. So we have to simulate these two paths. Further, the simulations may include IP packets at layer 3, i.e. the present invention may simulate at various layers such as layer 0 (fiber), 1 (OTN/SONET/SDH/DWDM), 2 (Ethernet), 3 (IP), and combinations thereof.

Advantageously, the present invention provides a simulation environment able to test all major components of the software as if it were running on real hardware. This means that all of the software down to but not including the hardware drivers is the same. The present invention also has the simulated hardware behaving like the real hardware. All aspects of the hardware including backplane communication, power units, LEDs, Ethernet, and even fiber connectivity are simulated to allow multi-node simulation. The simulation environment is able to simulate a multi-chassis network on a single developer workstation as well as spreading out the network on multiple workstations if it becomes too large for one workstation to manage. The present invention allows development, testing, modeling, etc. prior to hardware being available, when hardware is too expensive, test sets are too expensive, etc. Further, it may allow for demonstrations of software functionality to end users prior to hardware completion. It allows for large system tests that are too expensive to do with real hardware. The end users may be able to develop their own north bound interfaces prior to hardware delivery and to provide familiarity and training to operations and support personnel.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A network simulation system, comprising:
one or more interconnected workstations each comprising a digital computer running an operating system;
software executed on the one or more workstations, wherein the software is configured to:
operate a plurality of virtual machines with each virtual machine executing a hardware simulation application configured to operate in a same manner as a corresponding actual hardware device;
operate a virtual switch interconnecting two or more of the virtual machines, wherein the virtual switch and virtual machines are simulated and not connected to the corresponding actual hardware devices;
interface to a software load via a driver within each of the plurality of virtual machines, wherein the software load is associated with a network element and configured to operate and control actual physical hardware of the network element, wherein the network element comprises one of a router, switch, access device, base station, optical switch, optical add/drop multiplexer, DWDM device, Ethernet switch, or Optical Transport Network (OTN) switch; and
simulate hardware of the network element at a fiber level, a data plane level, a card level, and a chassis level for development and testing of real time embedded software systems without requiring the actual physical hardware to run the software load, wherein the fiber level is performed by creating fiber objects for transmit and receive fibers to interconnect two simulation ports together for messages passed therebetween having overhead and allowing simulated traffic loss via the fiber objects.

2. The network simulation system of claim 1, wherein the software is configured to:
operate a virtual switch interconnecting two or more of the virtual machines thereby forming a chassis.

3. The network simulation system of claim 1, wherein the software is configured to:
operate a fiber simulation in two or more of the plurality of virtual machines, wherein the fiber simulation is configured to simulate fiber connectivity between the two or more of the plurality of virtual machines.

4. The network simulation system of claim 1, wherein the software load comprises a software load configured to operate on future developed hardware, and wherein the network simulation system is utilized to test the software load via the hardware simulation application.

5. The network simulation system of claim 1, wherein the software load operates on the plurality of virtual machines and on actual hardware.

6. The network simulation system of claim 1, wherein the plurality of virtual machines simulate a plurality of nodes with fiber connections simulated therebetween.

7. The network simulation system of claim 6, wherein the software is configured to:
operate a virtual test set configured to inject simulated traffic through the plurality of nodes.

8. The network simulation system of claim 7, wherein the virtual test set comprises any of SONET, SDH, Optical Transport Network, and Ethernet.

9. The network simulation system of claim 8, wherein the software is configured to:
simulate a data plane comprising time division multiplexed traffic through the plurality of nodes.

10. The network simulation system of claim 8, wherein the software is configured to:
simulate Ethernet packets through the plurality of nodes.

11. A network simulation method, comprising:
operating a plurality of virtual machines on one or more interconnected workstations each comprising a digital computer running an operating system with each virtual machine executing a hardware simulation application configured to operate in a same manner as a corresponding actual hardware device;
operating a virtual switch interconnecting two or more of the virtual machines, wherein the virtual switch and virtual machines are simulated and not connected to the corresponding actual hardware devices;
operating a software load corresponding to a network element and configured to operate and control actual physical hardware of the network element, wherein the network element comprises one of a router, switch, access device, base station, optical switch, optical add/drop multiplexer, DWDM device, Ethernet switch, or Optical Transport Network (OTN) switch; and
simulating the actual hardware devices at a fiber level, a data plane level, a card level, and a chassis level for development and testing of real time embedded software systems via the plurality of virtual machines to operate the software load without the actual hardware devices and without requiring the actual physical hardware to run the software load, wherein the fiber level is performed by creating fiber objects for transmit and receive fibers to interconnect two simulation ports together for messages passed therebetween having overhead and allowing simulated traffic loss via the fiber objects.

12. The network simulation method of claim 11, further comprising:
forming a chassis through one or more of the plurality of virtual machines; and
operating a fiber simulation in two or more of the plurality of virtual machines, wherein the fiber simulation is configured to simulate fiber connectivity between the two or more of the plurality of virtual machines.

13. The network simulation method of claim 11, further comprising:
utilizing the plurality of virtual machines to simulate the actual hardware devices for testing and development.

14. The network simulation method of claim 11, further comprising:
operating the plurality of virtual machines to simulate a plurality of nodes with fiber connections simulated therebetween.

15. The network simulation method of claim 14, further comprising:
operating a virtual test set configured to inject simulated traffic through the plurality of nodes, wherein the virtual test set comprises any of SONET, SDH, Optical Transport Network, and Ethernet.

16. The network simulation method of claim 15, further comprising:
simulating a data plane comprising time division multiplexed traffic through the plurality of nodes.

17. The network simulation method of claim 15, further comprising:
simulating Ethernet packets through the plurality of nodes.

18. An optical network simulation environment system, comprising:
a plurality of nodes simulated via a plurality of virtual machines executed on one or more interconnected workstations each comprising a digital computer running an operating system;
fiber interconnections between the plurality of nodes simulated via a fiber simulation executed on the one or more interconnected workstations;
a test set simulation executed on the one or more interconnected workstations, wherein the test set simulation is configured to inject data traffic through the plurality of nodes; and
a software load representing actual hardware, wherein the software load is configured to execute on the plurality of nodes via simulation drivers and hardware simulation software which simulate the plurality of nodes at a fiber level, a data plane level, a card level, and a chassis level for development and testing of real time embedded software systems without requiring the actual physical hardware to run the software load, wherein the fiber level is performed by creating fiber objects for transmit and receive fibers to interconnect two simulation ports together for messages passed therebetween having overhead and allowing simulated traffic loss via the fiber objects, and wherein the software load is configured to operate and control actual physical hardware of a network element, wherein the network element comprises one of a router, switch, access device, base station, optical switch, optical add/drop multiplexer, DWDM device, Ethernet switch, or Optical Transport Network (OTN) switch;
wherein the actual hardware is not connected to the plurality of virtual machines while the test set simulation is executed.

19. The optical network simulation environment system of claim 18, wherein the plurality of nodes comprise optical switches configured to switch SONET, SDH, Optical Transport Network, and Ethernet traffic between a plurality of modules on each of the plurality of nodes, and wherein the plurality of virtual machines simulate the plurality of modules.

20. The optical network simulation environment system of claim 18, wherein the simulation drivers interface with a hardware abstraction layer associated with the software load and the hardware simulation software simulates actual hardware functionality.

* * * * *